Patented Oct. 24, 1950

2,527,010

UNITED STATES PATENT OFFICE 2,527,010

METHOD AND MEANS FOR COLORING PLASTIC SURFACES

Myron S. Jenner, New York, N. Y.

No Drawing. Application December 26, 1947, Serial No. 794,124

2 Claims. (Cl. 8—4)

My invention relates to coloring of plastic surfaces of articles and more particularly to the coloring of plastic coated flash lamps.

It is occasionally necessary to use flash illumination in outdoor photography in order to supply auxiliary illumination to parts of the picture shadowed from sunlight.

The light of the ordinary flashlamp is deficient in blue illumination (or excessive in red illumination), this condition being excessive as a lower color temperature. The conventional method of raising the color temperature, when color photographs are being made, is by the use of a blue filter placed over the camera lens. In mixed light, however, the blue filter would affect both equally, and the unbalance would still be present. Thus, it is necessary to raise the color temperature of the light from the flashlamp only, and the simplest means consists of coloring the lamp itself blue.

Such lamps are an article of commerce, the blue coloring being applied as part of the protective plastic coating on the lamp. Only a limited number of types of lamp are so supplied, in fact none is made for use with focal plane shutter cameras requiring the slow burning type. Accordingly, it is one of the objects of my invention to provide a method of coloring such clear plastic coated flash lamps.

Previous processes of coloring light bulbs employing coloring dips required heat generated by the warm lamp, in order to transparentize the coating, otherwise if applied to a cold lamp, a frosted effect would be produced. Obviously, this was out of the question with flash lamps. In addition, the drying time required hours instead of seconds.

The protective coating on flashlamps consists usually of a cellulose ester, such as cellulose acetate, cellulose nitrate, a mixture of both, or cellulose acetate butyrate copolymer. A further object consists in suitably coloring this existing coating with a dye. Such coating is thin and difficult to color. Additional objects of my invention consist in employing a solvent which will act as a vehicle for the dye; which will penetrate the coating of the lamp sufficiently to permit absorption of the dyestuff; which solvent will not affect the transparency or polished surface of the coating by clouding or hazing; which is highly volatile to promote rapid drying; which is adapted to color the coating quickly; which is either slow burning or non-inflammable; which will penetrate the surface of the plastic to a relatively fixed depth despite a certain variation of the time of immersion; which will deposit additional dye within the depth in proportion to the time of application and which solvent should not be excessively hygroscopic otherwise moisture will be carried into the coating and be trapped there by evaporation of the solvent, resulting in a cloudy coating.

I accomplish these and other objects as will be apparent from a consideration of the substances used, the methods of employing them, and the results obtained, as is disclosed in the following specification and particularly pointed out in the attached claims.

I have discovered that a solvent which possesses all the foregoing desirable characteristics is essentially pure trichloromethane ($CHCl_3$). An example of a suitable formula for the dye solution is:

Victoria Blue B (Bachmeier 126), .01 gram
Trichloromethane, 100.0 ml.

A simple procedure for the average user is to fill a small glass container with the dye solution and holding the flash lamp by the base, dip it into the solution until the plastic coating is immersed. The dye solution should reach the end of the plastic coating on the base portion. A plastic coated lamp, made by General Electric and Westinghouse, held in the above stated solution for five seconds will acquire a sufficient coloring to raise the Kelvin temperature rating of the lamp to about 6500°. The "Wabash" type should be held for 4 seconds. Increasing the concentration of dyestuff in the above formula increases the intensity of the blue color, and raises the effective color temperature of the light emitted by the lamp. Decreasing the concentration has the opposite effect. Variation of the time of dipping, or multiple dipping has a similar effect to that of increasing or decreasing the dye concentration.

After the flash lamp has been dipped into the solution for the desired period of time, it is removed and permitted to dry for five seconds. It may be thereafter wiped with a dry cloth, especially in damp weather when the evaporating bulb has a tendency to condense moisture from the atmosphere due to the temperature depression of the bulb surface brought about by the rapid evaporation of the solvent. A perfectly clear, transparent, and uniform blue coloration of the bulb may be secured without weakening or damaging the extremely thin plastic coating of the surface.

Any suitable dye may be employed which is soluble in the trichloromethane. It may be blue, or blue-purple in color in order to raise the color temperature of the light produced by the bulb. The concentration should be sufficient to obtain the desired shade of color in a reasonably short period of time.

Despite a variation in dipping of 5, 15, 30 and 60 seconds, a cellulose acetate-butyrate coating, when sectioned, showed substantially equal penetration of .0002 of an inch for all four times of dipping, producing four gradations of color. This ability to penetrate to a predetermined depth despite the variation of dipping time permits the variations of color to be obtained without damage to the thin coating.

The trichloromethane is the only solvent I have found which functions perfectly for the desired purposes.

Should trichloromethane be unobtainable, some other solvent may be used but with less desirable results. Examples are ethylene dichloride and methyl ethyl ketone.

I have also found that trichloromethane and a suitable dye may be used for coloring the plastic surface of articles. Plastics which may be so colored are the acrylics, polystyrenes, cellulose acetate, cellulose acetate-butyrate, vinyl acetate, vinyl acetate-chloride copolymer, and similar copolymers of vinyl halides and vinyl esters of aliphatic acid. The trichloromethane will penetrate the surface of the plastic to a predetermined depth, and deposit the dye without damaging the surface of the plastic or the surface polish or finish, the coloration being proportional to the time of application.

The non-inflammability of the trichloromethane makes the product advantageous from the standpoint of manufacture and consumer safety. This solvent additionally avoids the necessity of changing the thickness of the coating which might be necessary if a colored lacquer were used to re-coat the bulb. The dipping materials may be conveniently carried by the photographer with uncolored bulbs for evening use, the outdoor coloration required being added only when required from a single stock.

I claim:

1. A dipping solution for changing the color temperature of a photoflash lamp the bulb of which is provided with a thin coating of a cellulose ester, which consists of a substantially moisture free and quick drying solvent consisting of trichloromethane, and a transparent dye consisting of Victoria Blue B.

2. The method of changing the color temperature of the bulb of a photoflash lamp which comprises taking a bulb provided with a thin coating of a cellulose ester, and dipping the coated bulb into a solution consisting of substantially moisture free trichloromethane, to which a transparent dye has been added which is soluble in the solvent, for a period of about 5 seconds to about 60 seconds, whereby the color of the dye is deposited to a depth not substantially greater than .0002 inch.

MYRON S. JENNER.

REFERENCES CITED

The following references are of record in the file of this patent:

UNITED STATES PATENTS

| Number | Name | Date |
| --- | --- | --- |
| 1,891,520 | Bowley | Dec. 20, 1932 |
| 2,046,388 | Kurlander | July 7, 1936 |
| 2,260,543 | Smith | Oct. 28, 1941 |
| 2,273,305 | Whitehead | Feb. 17, 1942 |
| 2,384,001 | Wesson | Sept. 4, 1945 |

FOREIGN PATENTS

| Number | Country | Date |
| --- | --- | --- |
| 314,208 | Great Britain | July 4, 1929 |
| 412,952 | Great Britain | 1934 |